United States Patent [19]

Bryant

[11] 4,312,696
[45] Jan. 26, 1982

[54] TIRE BUILDING APPARATUS

[75] Inventor: Emerson C. Bryant, Edwardsburg, Mich.

[73] Assignee: National-Standard Company, Niles, Mich.

[21] Appl. No.: 129,595

[22] Filed: Mar. 12, 1980

[51] Int. Cl.³ .............................................. B29H 17/16
[52] U.S. Cl. ..................................... 156/415; 156/416; 156/420
[58] Field of Search ................... 156/123 R, 131, 132, 156/133, 398, 401, 403, 415–417, 420

[56] References Cited

U.S. PATENT DOCUMENTS

| | | | |
|---|---|---|---|
| 3,035,629 | 5/1962 | Vanzo et al. | 156/403 |
| 3,053,308 | 9/1962 | Vanzo et al. | 156/132 |
| 3,718,520 | 2/1973 | Leblond | 156/400 |
| 3,833,445 | 9/1974 | Mallory et al. | 156/401 |
| 4,007,081 | 2/1977 | Mallory | 156/417 |
| 4,011,127 | 3/1977 | Eichholz et al. | 156/416 |
| 4,214,939 | 7/1980 | Enders | 156/398 |
| 4,226,656 | 10/1980 | Appleby et al. | 156/132 |

*Primary Examiner*—John E. Kittle
*Attorney, Agent, or Firm*—Emrich, Root, Lee, Brown & Hill

[57] ABSTRACT

A tire building apparatus having two end drums disposed on respective opposite sides of an intermediate drum, with the intermediate drum embodying a perforated sleeve for supporting the portion of a tire carcass to be disposed between the beads of a completed tire and for permitting air to flow therethrough into direct contact with the aforementioned tire carcass for pneumatically expanding the latter, and with the end drums carrying bead lock clamping members and ply turn-up bags that are movable inwardly toward the longitudinal center of the apparatus during the aforementioned expanding of the tire carcass, the bags being of dual-compartment construction, having inner compartments for effecting ply turn-up operations at air pressures greater than the air pressure for expanding and supporting the tire carcass, and outer compartments for effecting additional sidewall-applying operations at internal air pressure less than the pressures in the inner compartments, and with the components of the intermediate drum and end drums being readily removable and replaceable for changing the size of the tire to be produced by the apparatus.

In a modified form of the invention, which is particularly well adapted for completing the building of a tire from a preformed carcass that embodies the two beads and the sidewall components of the tire, the apparatus embodies a modified form of the construction of the preferred form of the apparatus which, among other things, does not embody the ply turn-up bags thereof.

21 Claims, 18 Drawing Figures

TIRE BUILDING APPARATUS

BACKGROUND OF THE INVENTION

This invention relates to tire building apparatus, and, more particularly, to tire building apparatus wherein the carcass material is expanded pneumatically, without use of any solid expansion members.

It is a primary object of the present invention to afford a novel tire building apparatus.

A further object of the present invention is to afford a novel tire building apparatus wherein the carcass material, between the beads, is expanded pneumatically, in a novel and expeditious manner, without the use of solid expansion members.

Another object is to afford a novel tire building apparatus wherein the carcass material, between the beads, is expanded pneumatically by the direct application of air against the carcass material.

A further object of the present invention is to afford a novel tire building apparatus of the aforementioned type, wherein ply turn-up operations and the application of the side wall components may be effected pneumatically.

Tire building apparatus, wherein the portion of the carcass material disposed between the beads is expanded pneumatically, has been heretofore known in the art, being shown, for example in U.S. Pat. Nos. 3,035,629, issued May 22, 1962 to M. Vanzo et al, and 3,053,308, issued Sept. 11, 1962 to M. Vanzo et al; and in my co-pending application for U.S. Patent, Ser. No. 087,876 filed Oct. 24, 1979, and which is a continuation-in-part of my earlier filed, co-pending application for U.S. Patent, Ser. No. 944,578, filed Sept. 21, 1978, which is now abandoned. It is an important object of the present invention to afford improvements over such tire building apparatus heretofore known in the art.

Also, tire building apparatus wherein the ply turn-up operations and the application of side wall components have been effected pneumatically have been heretofore known in the art, being shown, for example, in the aforementioned Vanzo et al Pat. No. 3,053,308, and in U.S. Pat. No. 3,833,445, issued Sept. 3, 1974 to Edwin E. Mallory and myself, as well as in my aforementioned application for U.S. Patent now pending and in my aforementioned application for U.S. Patent, Ser. No. 944,578. It is another important object of the present invention to afford improvements over such tire building apparatus heretofore known in the art.

Another object of the present invention is to afford a novel tire building apparatus wherein, during the operation thereof, the carcass-forming operations are preformed in a novel and expeditious manner.

An object ancillary to the foregoing is to afford a novel tire building apparatus of the aforementioned type wherein the aforementioned operations are preformed pneumatically.

One of the problems which has heretofore been common in the operation of the tire building apparatus heretofore known in the art, wherein the carcass material, between the beads, has been expanded outwardly by members actuated mechanically or pneumatically, has been that the green tire components tend to stick or adhere to the members after expansion. Another problem has been that the aforementioned carcass material tends to take on irregularities, such as bulges or other unevenness, that may be present in the members effecting the expansion of the carcass material.

It is an important object of the present invention to enable such carcass material to be expanded, in a novel and expeditious manner, without the use of internal expansion members.

Another object is to afford a novel tire building apparatus in the operation of which the expansion of the carcass material, between the beads, may be effected in a novel and expeditious manner, without subjecting it to deformation by, or adherence to internal expansion members.

Yet another object of the present invention is to afford a novel tire building apparatus wherein the components of the apparatus may be quickly and easily changed to adapt the apparatus for the building of various size tires, without extensitve over-haul of the apparatus and without prolonged shut-down time thereof.

Another object of the present invention is to afford a novel tire building apparatus of the aforementioned type which embodies a novel intermediate drum and two end drums, disposed on respective opposite sides of the intermediate drum, constituted and arranged in a novel and expeditious manner.

A further object of the present invention is to afford a novel tire building apparatus which may be used to build a complete tire in a single stage.

Another object of the present invention is to afford a novel tire building apparatus which may be used to complete the building of a tire that has been pre-constructed on another suitable apparatus.

Another object of the present invention is to afford a novel tire building apparatus of the aforementioned type which is practical and efficient in operation, and which may be readily and economically produced commercially.

Other and further objects of the present invention will be apparent from the following description and claims and are illustrated in the accompanying drawings which, by way of illustration, show the preferred embodiments of the present invention and the principles thereof, and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE EMBODIMENTS SHOWN HEREIN

Tire building apparatus 1, for building a complete tire and embodying the principles of the present invention, is shown in FIGS. 1–13 of the drawings to illustrate the presently preferred embodiment of the present invention.

The tire building apparatus 1 is of a type which may be embodied in any suitable tire building machine, such as, for example, a machine of the type shown in U.S. Pat. No. 4,007,081, issued Feb. 8, 1977 to Edwin E. Mallory. It is of the same general type as the tire building apparatus shown in my aforementioned, co-pending application for U.S. Patent Ser. No. 087,876, except that, in the present apparatus, the tire carcass material, between the beads is expanded by the direct application of air thereagainst.

Figure 1:
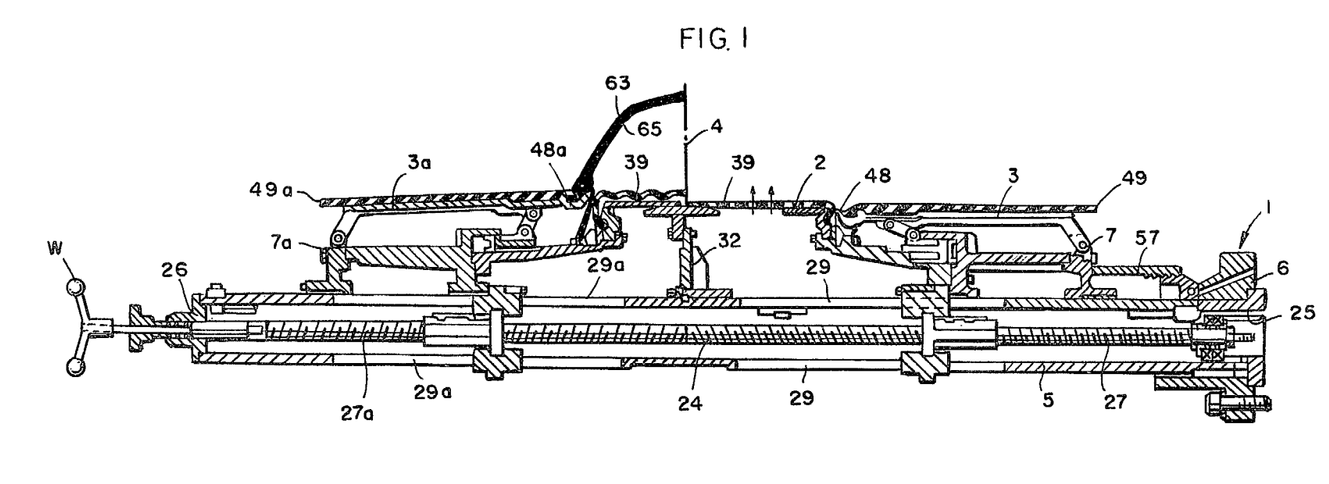
FIG. 1 is a longitudinal sectional view of a tire building apparatus, embodying the principles of the present invention, with the apparatus shown in collapsed position at the right side thereof and in expanded position at the left side thereof.
Figures 2, 2A:
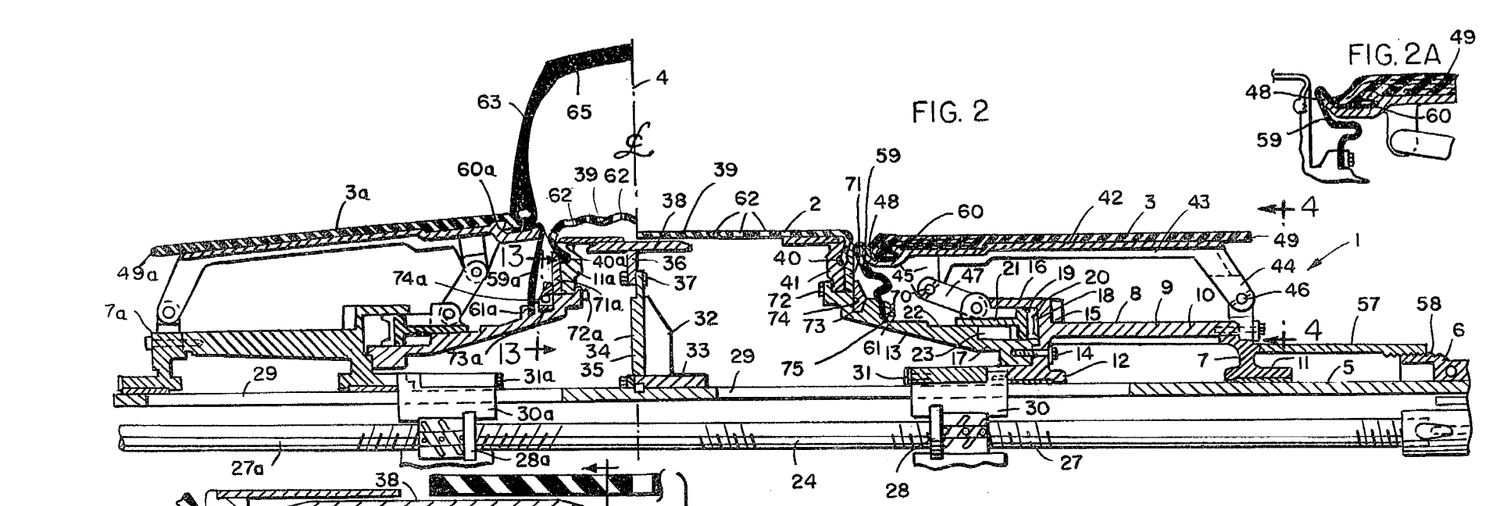
FIG. 2 is a fragmentary, enlarged sectional view similar to FIG. 1.
FIG. 2A is an enlarged fragmentary sectional view of the bead lock mechanism in accordance with the present invention.

The tire building apparatus 1 embodies, in general, an intermediate drum assembly 2 and two end drum assemblies 3 and 3a disposed on opposite longitudinal sides of the intermediate drum assembly 2, the end drum assemblies 3 and 3a being disposed to the right and left, respectively, of the intermediate drum assembly 2, as viewed in FIGS. 1 and 2. The drum assemblies 2, 3 and 3a and the actuating apparatus therefor are symmetrical on opposite sides of the transverse center plane 4 of the tire building apparatus 1, and the parts therefor which are disposed to the left of the center plane 4, which are identical to parts shown to the right thereof, are indicated by the same reference numerals with the suffix "a" added thereto. Also, it is to be observed that in FIGS. 1 and 2, the portions of the drums 2 and 3 and the actuating mechanism therefor, which are disposed to the right of the center plane 4, are shown disposed in collapsed position, and the portions of the drums 2 and 3a and the actuating apparatus therefor, disposed to the left of the center plane 4, are shown in expanded position.

The tire building apparatus 1 includes a hollow, main shaft 5, which extends longitudinally therethrough. The shaft 5 extends axially through the drums 2, 3 and 3a, and the right end thereof is secured to a suitable mounting flange 6, which may be mounted on or secured to the driving or revolving portion of a tire building machine, not shown. The left end of the main shaft 5 may be mounted in any suitable supporting portion, not shown, of such a tire building machine.

A substantially cylindrical-shaped carrier unit 7 is mounted on the shaft 5 to the right of the center plane 4, in surrounding relation thereto. The carrier unit 7 embodies a housing 8 having a substantially cylindrical-shaped side wall portion 9 disposed in outwardly spaced, surrounding relation to the main shaft 5. The side wall 9 has an outer end portion 10, from the outer and inner ends of which radially inwardly project two annular flanges 11 and 12, respectively, FIG. 2. The flanges 11 and 12 are disposed on the main shaft with a relatively snug, but freely slidable fit, for supporting the carrier unit 7 on the shaft 5. The side wall 9 of the housing 8 also includes an inner end portion 13, which is secured to the inner end of the rear end portion 10 of the side wall 9 by bolts 14 extending through the inner flange 12, and flares radially outwardly therefrom, FIG. 2.

The outer end portion 10 of the side wall 9 has a radially outwardly projecting flange 15 on the inner end portion thereof, and a sleeve 16 projecting from the outer periphery of the flange 15 toward the center plane 4 in outwardly spaced, concentric relation to the outer end portion 17 of the inner end portion 13 of the side wall 9, to define an annular cylinder 18 extending around the main shaft 5. An annular piston 19 is mounted in the cylinder 18 and is reciprocable therein axially of the main shaft 5, for a purpose which will be discussed in greater detail presently.

The piston 19 has an annular head portion 20 mounted in the cylinder 18 with a relatively snug, but freely slidable fit between the sleeve 16 and the outer end portion 17 of the inner end portion 13 of the side wall 9. The piston 19 also includes an annular sleeve or skirt portion 21 projecting from the head portion 20 toward the center plane 4 in concentric relation to the main shaft 5, FIG. 2. The inner end portion of the sleeve 21 is disposed in surrounding, sliding engagement with the outer face of an intermediate portion 22 of the inner end portion 13 of the side wall 9 in position to define another annular cylinder 23 between the sleeve 21 and the outer end portion 17 of the inner end portion 13 of the side wall 9, FIG. 2.

A carrier unit 7a, which is identical in contruction to the carrier unit 7, except that it is a mirror image thereof, is mounted to the left of the center plane 4, FIGS. 1 and 2, and it is to be remembered that the parts thereof which are identical to corresponding parts in the carrier unit 7 are indicated by the same reference numerals with the suffix "a" added thereto.

An inner shaft 24 extends longitudinally through the main shaft 5, in axial relation thereto, and is rotatably mounted in bearing assemblies 25 and 26 disposed in the right and left ends, respectively, of the main shaft 5, as viewed in FIG. 1. The inner shaft 24 has oppositely threaded end portions 27 and 27a disposed on opposite sides of the center plane 4, FIG. 2, and ball nuts 28 and 28a are mounted on the end portions 27 and 27a, respectively, in threaded engagement therewith. The ball nuts 28 and 28a are movable inwardly toward each other during rotation of the shaft 24 in one direction and outwardly away from each other during rotation of the shaft 24 in the other direction and are equal distance from the center plane 4 regardless of position.

The main shaft 5 has two diametrically opposed slots 29 extending therethrough to the right of the center plane 4, and two diametrically opposed slots 29a extending therethrough to the left of the center plane 4, as viewed in FIG. 1. Each of the ball nuts 28 and 28a has two adapters 30 and 30a, respectively, projecting outwardly through respective ones of the slots 29 and 29a, respectively. The adapters 30 and 30a are secured to the flanges 12 and 12a of the carrier units 7 and 7a by bolts 31 and 31a, respectively, so that, upon movement of the ball nuts 28 and 28a inwardly and outwardly relative to each other longitudinally of the inner shaft 24, the carrier units 7 and 7a are correspondingly moved inwardly and outwardly toward and away from each other along the main shaft 5, always equal distance from the center plane 4.

The intermediate drum assembly 2 embodies a central supporting member 32 disposed on the transverse center plane 4 of the tire building assembly 1, FIG. 2. The central supporting member 32 embodies an annular base or mounting ring 33, FIGS. 2 and 4, mounted on and secured to the outer surface of the main shaft 5 between, and in spaced relation to the slots 29 and 29a through the latter. The supporting member 32 embodies a disk 34 projecting radially outwardly from the mounting ring 33, FIG. 3. The disk 34 embodies body portion 35 projecting radially outwardly from the mounting ring 33, and a head portion 36 mounted on and secured to the outer end portion of the body portion 35 by a suitable respective fastening member, such as a bolt 37, FIG. 3. The radially outer surface 38 of the head portion 36 defines a circular supporting surface concentric to the shaft 5.

An elastic drum sleeve or diaphragm 39 is preferably disposed around the outer peripheral surface 38 of the head portion 36, and has oppositely disposed, enlarged annular end portions 40 and 40a mounted in end rings 41 and 41a, disposed on and secured to the inner ends of the inner end portions 13 and 13a of the side walls 9 and 9a of the carrier units 7 and 7a, respectively, FIG. 2, for a purpose which will be hereinafter discussed in greater detail.

The end drum 3 embodies a plurality of elongated supporting arms or drum segments 42, equally spaced around the carrier unit 7. Each of the drum segments 42 embodies an elongated body portion 43, having an outer leg 44 and an inner leg 45 projecting inwardly toward the carrier unit 7 from respective opposite ends thereof. The free end portions of each of the legs 44 are pivotally secured to the outer end portions of the carrier unit 7 by suitable means such as fasteners or bolts 46, and each of the inner legs 45 of the drum segments 42 is pivotally connected by a respective link 47 to the annular piston 19. Preferably, the legs 44 and 45 and the links 47 are of such length that, when the end drum 3 is disposed in fully collapsed position, with the piston 19 disposed in the outwardly disposed position in the cylinder 18 shown in FIG. 2, the body portion 43 of each of the drum segments 42 is disposed in outwardly spaced, substantially parallel relation to the main shaft 5. Each of the body portions 43 of each of drum segments 42 has an arcuate bead lock clamp member 48, of a conventional type, disposed at the inner end thereof.

Supported on the outer periphery of the end drum 3 is an inflatable ply turn-up bag 49, FIGS. 2, 5-7 and 9-12. The bag 49 may be of any suitable type, such as, for example, the type shown in U.S. Pat. No. 3,833,445, issued to Edwin E. Mallory, but preferably is of a dual compartment or two-bag configuration, embodying an outer low pressure bag 50 and an inner high pressure bag 51, FIGS. 5 and 10. The low pressure bag 50 embodies an inner layer of rubber 52 and an outer layer of rubber 53, FIG. 5, which, if desired, may also be axially reinforced by steel cords or other material of high tensional strength. At the inner end of the bag 50, the inner layer 52 is formed with a truncated portion 54, having a snug fit with correspondingly formed grooves in the bead lock clamp members 48 on the inner ends of the drum segments 42. The truncated portions 54 are ported in any suitable manner for admitting fluid under pressure into the bag 50 to effect inflation thereof, and also for release of fluid under pressure for deflation of the bag 50.

Figure 5:
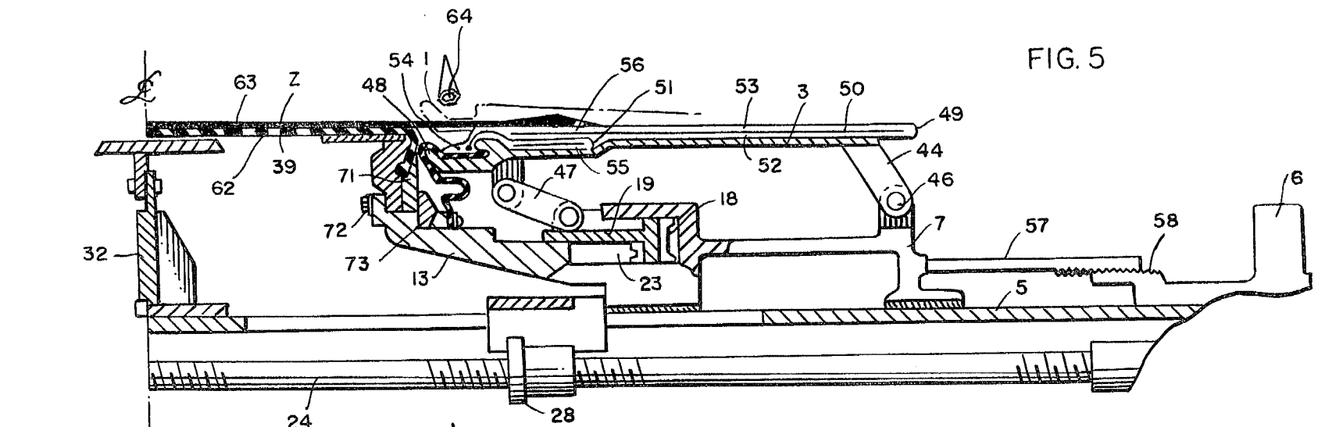
FIGS. 5–7 are diagrammatic longitudinal sectional views corresponding generally to the right end portion of FIG. 2 and showing various positions of the components of the tire building apparatus in forming a tire.
Figures 10, 11:
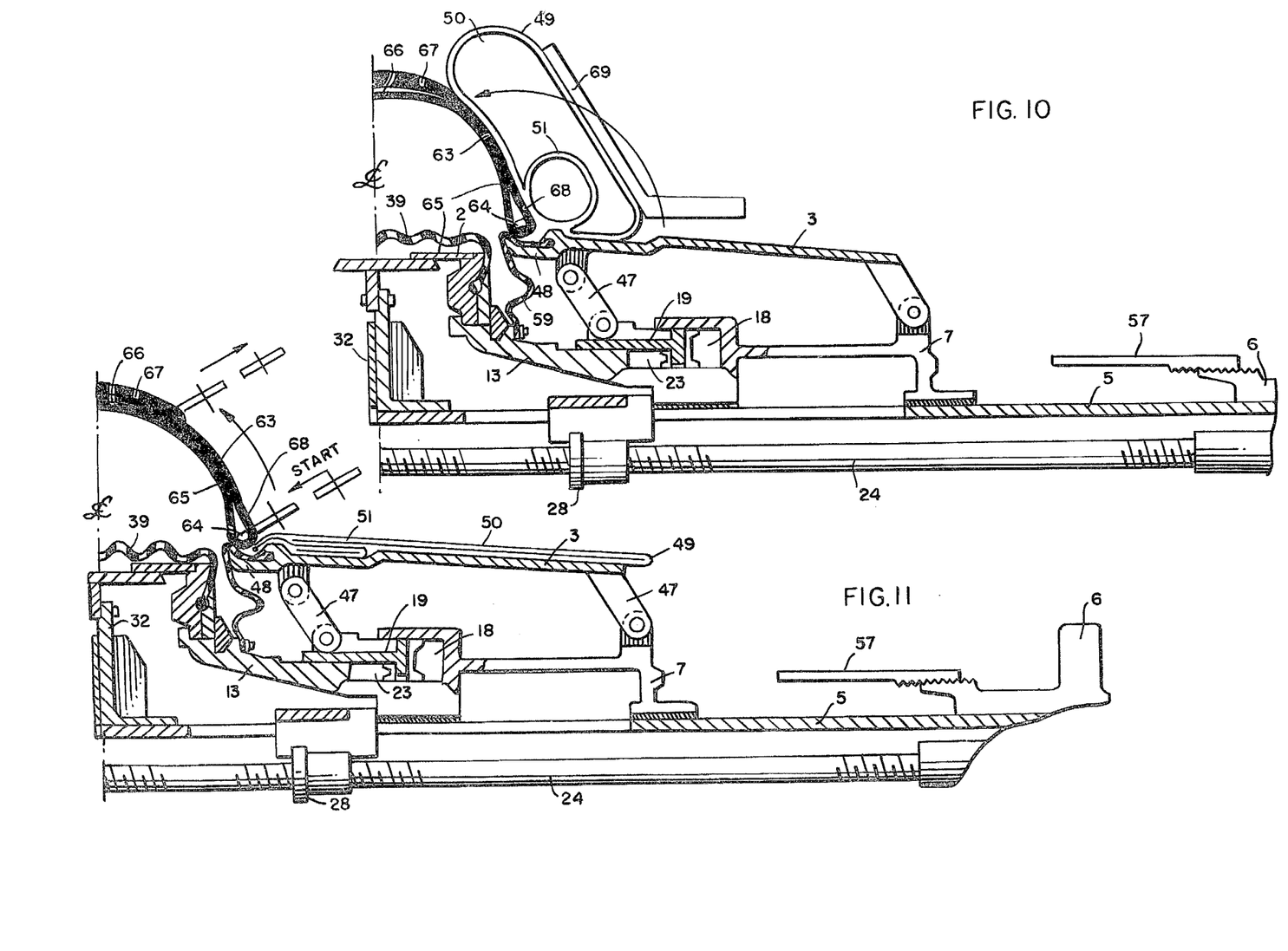

The high pressure bag 51 also embodies two layers of rubber 55 and 56 disposed axially outwardly of the truncated portion 54 and lying inwardly within the bag 50, FIGS. 5 and 10. Any suitable ports, not shown, may be provided for admitting fluid under pressure into the high pressure bag 51 and releasing pressure therefrom in the operation of the tire forming apparatus 1, as will hereinafter be discussed in greater detail.

An end drum 3a and an inflatable ply turn-up bag 49a, which are identical in construction to the end drum 3 and the turn-up bag 49, respectively, are mounted on the carrier unit 7a, to the left of the center plane 4, as viewed in FIG. 2, and parts thereof, which are identical to corresponding parts of the end drum 3 and the bag 49, respectively, are indicated in the drawings by the same reference numerals as the aforementioned corresponding parts, with suffix "a" added thereto.

It will be remembered that, during rotation of the inner shaft 24 relative to the main shaft, during operation of the tire forming apparatus 1, the carrier units 7 and 7a, and, therefore, the end drums 3 and 3a are caused to move inwardly and outwardly relative to each other axially of the main shaft 5. The extent of such inward movement of the carrier units 7 and 7a and the end drums 3 and 3a may be controlled by any suitable means such as, for example, suitable limit switches connected to a drive motor, not shown, for rotating the shaft 24. However, for limiting the outward movement of the carrier units 7 and 7a and the end drums 3 and 3a, and thereby controlling the position of the bead disposed in the tire to be formed in the apparatus 1, as will be discussed in greater detail, it is preferred to use an adjustment nut or sleeve 57, mounted on and threadably engaged with an inner end portion 58 of the mounting flange 6. The adjustment nut 57 projects axially inwardly from the mounting flange 6 and is disposed in position around the main shaft 5 wherein the inner end of the nut 57 will abuttingly engage the outer flange 11 of the carrier unit 7, when the carrier units 7 and 7a and the end drums 3 and 3a have moved to their desired outermost positions on the inner shaft 24. By rotating the nut 57 on the end portion 58 of the mounting flange 6, this outermost position of the carrier units 7 and 7a and the end drums 3 and 3a may be readily and accurately adjusted.

Adjustment of the carrier units 7 and 7a to their normal, initial, at-rest position, prior to the initiation of a tire-building operation of the apparatus is normally performed by controlling the drum driving means. However, it may be manually accomplished by attaching a hand wheel assembly W to the shaft 24 and turning the hand wheel W, FIG. 1, with the shaft 24 disconnected from its drive means, to thereby dispose the carrier unit 7 in the aforementioned abutting engagement with the inner end of the adjustment nut 57. This manual adjusting of the carrier unit is best used for "set-up" of the drum to specific tire specifications.

A ring-shaped, elastic sleeve or diaphragm 59 is disposed around the shaft 5 in outwardly spaced, concentric relation thereto. The diaphragm has a truncated portion 60 defining the outer periphery thereof and disposed between the truncated portion 54 of the inflatable ply turn-up bag 49 and the inner surface of the bead lock clamp member 48, FIG. 2. The inner annular edge portion of the diaphragm 59 is secured to the inner housing end portion 13 by suitable means such as a continuous metal ring 75 and bolts or screws 61. Another diaphragm 59a, which is identical in construction to the diaphragm 59 is similarly mounted in the apparatus 1 at the left of the center line 4, FIG. 2. The diaphragms 59 and 59a are air-impervious for a purpose which will be hereinafter discussed in greater detail.

The drum sleeve 39 of the apparatus 1, unlike the drum sleeve of the tire building apparatus disclosed in my aforementioned co-pending application for U.S. Patent, Ser. No. 087,876, has a plurality of perforations 62 extending therethrough and spaced therearound for a purpose which will be discussed in greater detail presently.

In the operation of the tire building apparatus 1, the intermediate drum 2 and the end drums 3 and 3a are initially disposed in fully collapsed position, with the end drums 3 and 3a disposed in full outermost position on the main shaft 5, wherein the flange 11 of the carrier unit 7 is disposed in abutting engagement with the bead set adjustment nut 57, as illustrated by that part of the apparatus 1 disposed to the right of the center plane 4 in FIG. 2. In this position of the tire building apparatus 1, the pistons 19 and 19a are disposed in their full outermost positions in the cylinders 18 and 18a, respectively, as illustrated by the piston 19 in FIG. 2, to thereby, preferably, dispose the outer surfaces of the bags 49 and 49a on the end drums 3 and 3a and the outer surface of the sleeve 39 on the intermediate drum 2 in axial alignment with each other. With the parts of the apparatus 1 disposed in such position, in a conventional manner and as shown in FIG. 5, carcass and side wall material 63 may be applied over the elastic drum sleeve 39 and the ply turn-up bags 49 and 49a, and tire beads 64 and 64a may be positioned radially outwardly of the bead lock clamp members 48 and 48a and held in such position by bead holders, not shown.

Figure 6:
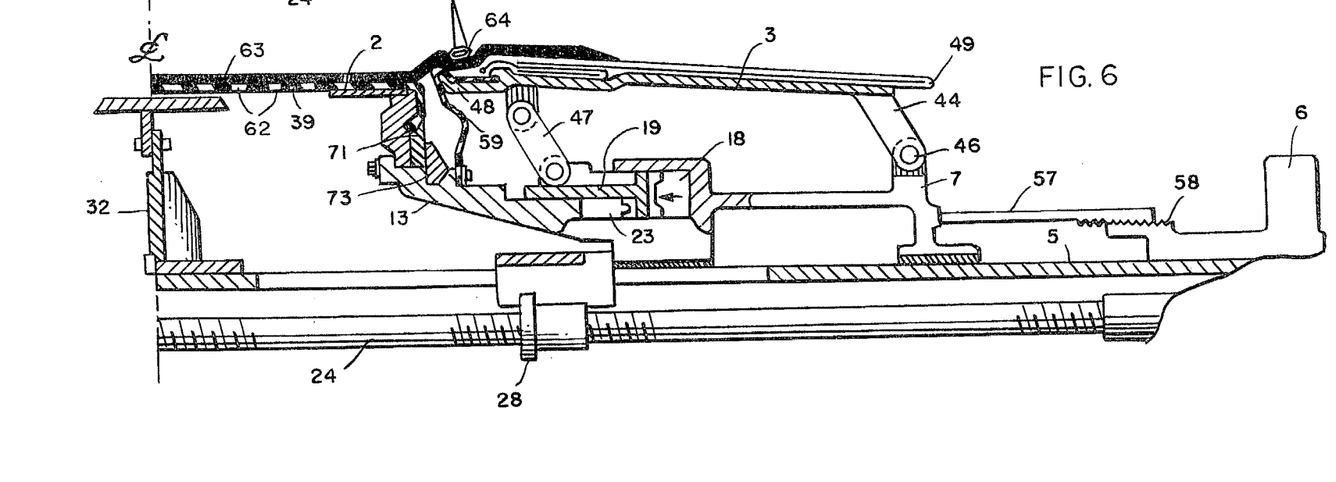

Air under pressure may then be introduced into the cylinders 18 and 18a in the carrier units 7 and 7a, respectively, by conventional porting, not shown, to thereby move the pistons 19 and 19a axially inwardly, the cylinders 23 and 23a, at this time, being open to atmosphere. As shown in FIG. 6, the inward movement of the pistons 19 and 19a is effective, through the links 47, to move the bead lock clamp members 48 and 48a on the inner end portions of the end drum segments 42 and 42a, respectively, radially outwardly to engage or lock, accurately and concentrically, the tire material 63 with the tire beads 64. Thereafter, the inner shaft 24 may be rotated by suitable drive means, such as, for example, a motor, not shown, in the proper direction to cause the ball nuts 28 and 28a to move axially inwardly toward each other and thereby move the carrier units 7 and 7a, respectively, inwardly therewith; and simultaneously with the inward movements of the carrier units 7 and 7a, air under pressure may be fed into the interior of the intermediate drum assembly 2, between the carrier units 7 and 7a. The air fed into the drum assembly 2 passes outwardly through the openings 62 in the drum sleeve 39 into direct contact with the inner surface of the portion 65 of the carcass material 63 disposed between the tire beads 64 and 64a. The diaphragms 59 and 59a seal the interior of the carcass material 63, between the beads 64 and 64a, from the passage of air outwardly therefrom between end housings 13 and 13a and the drums 3 and 3a.

Figures 7, 8, 9:
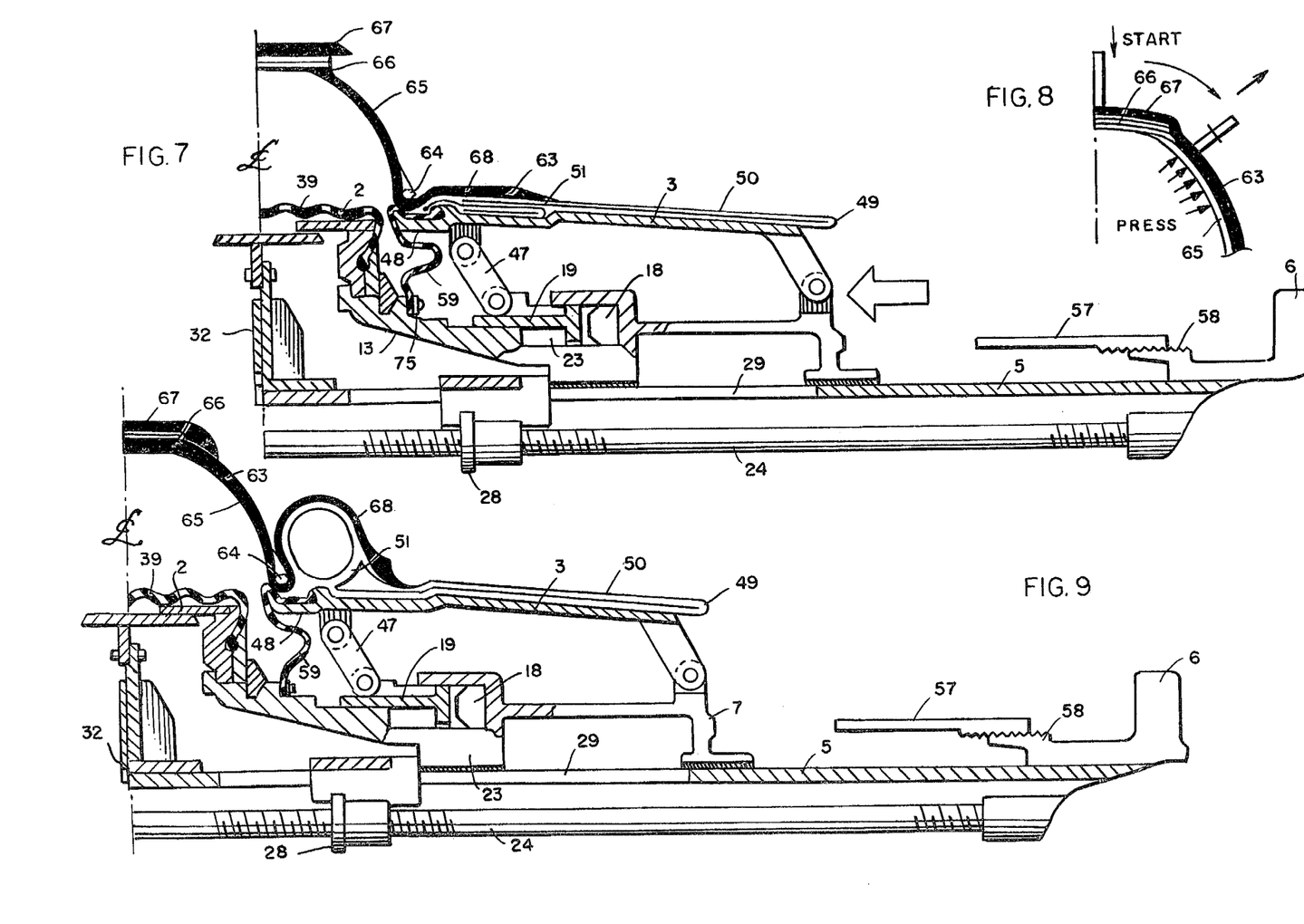
FIG. 8 is a diagrammatic sectional view illustrating a stitching step in the forming of a tire.
FIGS. 9–12 are diagrammatic longitudinal sectional views corresponding generally to the right end of FIG. 2, and similar to FIGS. 5–7, but showing various additional positions of the components of the tire building apparatus in forming a tire.

This simultaneous inward movement of the carrier units 7 and 7a and application of air pressure to the interior of the carcass material 63 causes the bead lock clamp members 48 and 48a and the locked beads 64 and 64a to move axially inwardly with the carrier units 7 and 7a, and causes the portion 65 of the carcass material 63, between the beads 64 and 64a to be bulged outwardly into a toroidal shape, as shown in FIG. 7. At this stage of the operation, the expansion of the portion 65 of the carcass material 63 has placed the tire carcass material 63 under tension and partially preformed the same; and the axial inward movement of the bead lock clamp members 48 and 48a, with the carrier units 7 and 7a, respectively, has moved the locked beads 64 and 64a into positions directly radially inwardly of the shoulders of the tire under construction. When the carrier units 7 and 7a have moved into these last mentioned, innermost positions on the shaft 24, further inward movement of the carrier units 7 and 7a is stopped by suitable means, such as, for example, a limit switch on the drive motor for the shaft 24, not shown.

Thereafter, in a conventional manner, breaker and tread cap components 66 and 67, FIG. 7, may be applied and secured or stitched to the partially preformed tire carcass, as shown in FIG. 8. Breaker and tread cap components, if preferred, may be pre-constructed on a suitable building drum and be pre-positioned radially about the center line 4 of the tire. They would be supported there by a transfer means, not shown. In this instance, the tire carcass would be expanded directly into the belt and tread cap by the aforementioned expansion means. The belt transfer and support means is then removed, and tread cap stitching is completed, as shown in FIG. 8. The side wall portions 68 of the tire material 63 may be turned up and applied to the carcass by inflation of the ply turn-up bag 49 and axial inward movement of pusher rings 69, FIGS. 9–10, and the side wall material may then be stitched, FIG. 11.

In the actuation of the turn-up bags 49 and 49a, the high pressure bags 51 and 51a are first inflated, FIG. 9, to encase the tire beads 64 and 64a in portions 65 and 68 of the tire carcass material, and the low pressure bags 50 and 50a are then inflated and the pusher rings 69 are moved inwardly to apply the sidewall components and the outer end portions of the carcass material to the sidewalls of the shaped portion 65 of the carcass material 63.

Figure 12:
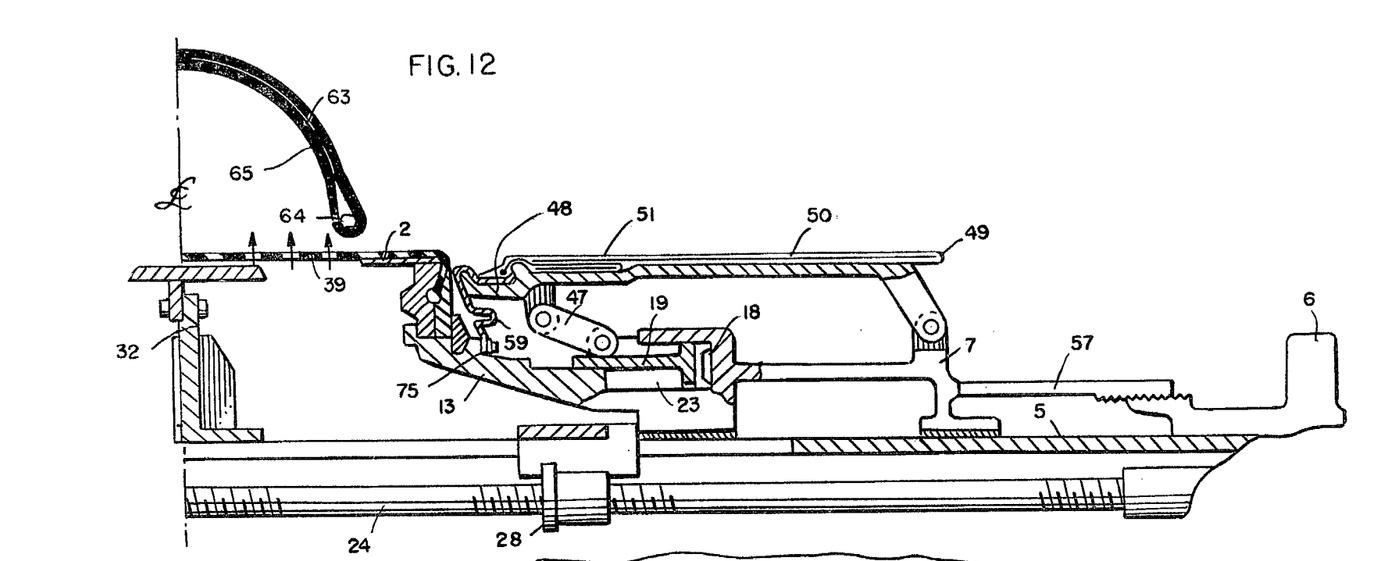

Thereafter, air under pressure may be introduced into the cylinders 23 and 23a in the carrier units 7 and 7a, and, with the cylinders 18 and 18s being vented to atmosphere, the pistons 19 and 19a are moved axially outwardly to thereby move the bead lock clamp members 48 radially inwardly out of engagement with the beads of the formed tire; and the shaft 24 may be rotated in a reverse direction by its aforementioned driving means, not shown, to thereby move the carrier units 7 and 7a back out into their outermost position, as shown in FIG. 12, wherein the carrier unit 7 is again abuttingly engaged with the adjustment nut 57.

The formed tire carcass may then be removed from the tire building apparatus 1 by axially moving the same outwardly over an end thereof. Thereafter, of course, the tire may be cured in a conventional curing mold to form a completed tire.

As discussed in my aforementioned application for Patent, Ser. No. 087,876, now pending, and in my aforementioned application for Patent, Ser. No. 944,587, in connection with the tire building apparatus shown therein, I have found that in building a tire on the apparatus 1, while it is desirable that the air pressure in the portion 65 of the carcass material 63 be sufficient to prevent distortion thereof during ply turn-up and side wall-application operations, it should not be so great as to cause excessive outward pressure on the portion 65 of the carcass material 63 sufficient to cause slippage of the carcass material relative to the beads 64 and the bead lock clamp members 48. The latter is particularly true with respect to the building of truck tires, which, normally, are broader and the expansion of which causes greater tension on the side walls thereof than is true with respect to smaller tires, such as, for example, automobile tires.

Also, I have found that with the apparatus 1 constructed in the aforementioned manner, the air pressure in the high pressure bags 51 and 51a, during a ply turn-up operation, may be, and preferably is greater than the air pressure in the portion 65 of the carcass material 63. Of course, as has been true with respect to two-compartment turn-up bags heretofore known in the art, the pressure in the high pressure bags 51 and 51a is preferably higher than the pressure in the low pressure bags 50 and 50a.

In this connection, I have found that in the building of truck tires on an apparatus, such as the apparatus 1, the air pressure in the portion 65 of the carcass material 63, during a ply turn-up operation, should not be substantially less than 12 pounds per square inch and not substantially more than 25 pounds per square inch, and, preferably, is in the nature of 15 pounds per square inch; and in the building of an automobile tire, the pressure in the portion 65 of the carcass material 63 should not be substantially less than 15 pounds per square inch and not substantially more than 30 pounds per square inch, and, preferably, is in the nature of 22 pounds per square inch. Also, I have found that in such operation of the apparatus 1, the air pressure in the high pressure bags 51 and 51a preferably is not substantially less than one and one-half times and not substantially more than twice the air pressure in the portion 65 of the carcass material 63, and is not substantially less than one and one-half times and not substantially more than five times the air pressure in the outer bags 50 and 50a, and that to maintain this relationship, the pressure in the high pressure bags 51 and 51a should not be substantially less than 25 pounds and not substantially more than 35 pounds, and preferably, is in the nature of 30 pounds per square inch, and that the pressure in the low pressure bags 50 and 50 should not be substantially less than 6 pounds per square inch and not substantially more than 15 pounds per square inch, and, preferably, is in the nature of 10 pounds per square inch.

From the foregoing it will be seen that in the operation of the novel tire apparatus 1, the portion 65 of the carcass material 63 is expanded outwardly into its desired shape by directly applied pneumatic pressure, and without being engaged, internally, by expansion members, as has been heretofore common in the art. As a result, the carcass material portion 65 is not subjected to the dangers of any irregularities that may be present in such internally disposed expansion members; and there is no danger of its sticking or adhering to such members, with the consequent necessity of peeling or separating it therefrom, as has been commonly true with respect to tire building apparatus heretofore known in the art.

In the preferred form of the present invention, the inner legs 45 of the drum segments 42, FIG. 2, are secured to the respective links 47 by bolts 70, so that the drum segments 42 are releasably secured to the carrier unit 7 by bolts 46 and 70, and may be quickly and easily removed and replaced, as will be discussed in greater detail presently.

Figure 13:
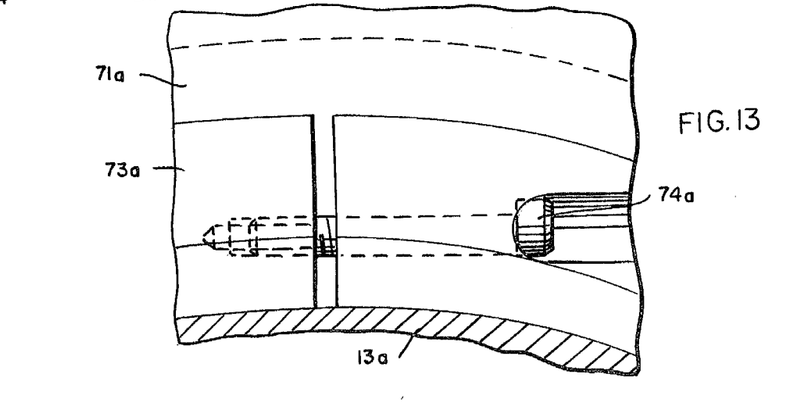
FIG. 13 is detail sectional view taken along the line 13—13 in FIG. 2.

In addition, in the preferred form of the invention shown in the drawings, the end portions 40 and 40a of the sleeve 39 are held in the end rings 41 and 41a, respectively, disposed outwardly of the latter. The end rings 41 and 41a are secured to the inner ends of the inner portions 13 and 13a of the housings 8 and 8a of the carrier units 7 and 7a by suitable means such as bolts 72 and 72a, respectively, and other rings 71 and 71a are releasably held against the outer faces of the end rings 41 and 41a by split clamping rings 73 and 73a mounted in annular grooves in the aforementioned end portions 13 and 13a of the carrier units 7 and 8a, FIGS. 2 and 3, and releasably held in clamping engagement with the rings 71 and 71a by suitable means such as bolts or pins 74 and 74a, as shown in FIG. 13.

Figure 3:
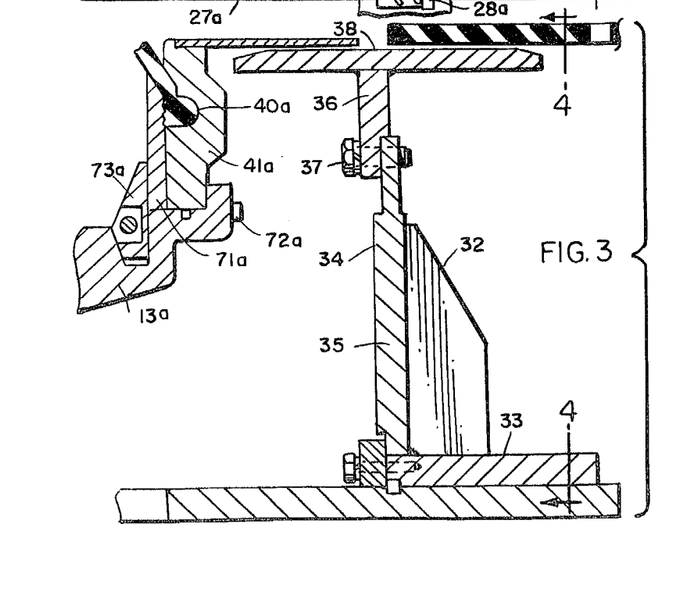
FIG. 3 is an enlarged, fragmentary detail sectional view of a portion of the apparatus shown in FIG. 2.
Figure 4:
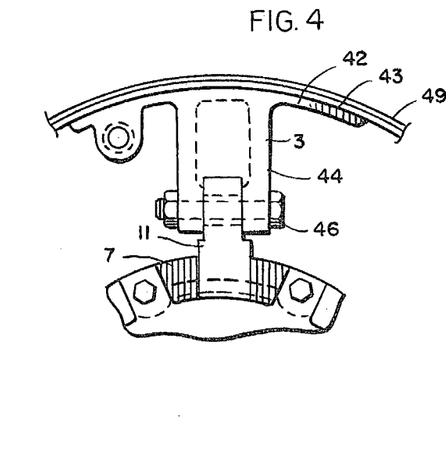
FIG. 4 is a detail sectional view taken substantially along the line 4—4 in FIG. 2.

It will be remembered that, in the presently preferred embodiment of the present invention, the central supporting member 32 of the intermediate drum assembly 2, FIGS. 2 and 3, embodies a disk 34 projecting radially outwardly from a mounting ring 33, with the disk 34 embodying a head portion 36 releasably secured to the outer end of a body portion 35 by bolts 37. With this construction, if it is desired to change the size of the supporting member 32 in the apparatus 1, this may be readily accomplished by removing the bolts 37 and moving the head portion 36 axially outwardly over the outer drum 3a, from which the drum segments 42 have been previously removed. A new head portion 36 of the proper size for the tire which is to be built may be moved axially inwardly over the outer drum 3a and secured to the body portion 34 of the supporting member 32 by bolts 37.

With this construction, the apparatus 1 may be readily changed to build different size tires. Thus, if such a change is desired, the bolts 46 and 46a may be removed and the end drum segments 42 and 42a may be swung outwardly around the bolts 70 and 70a, respectively, to afford access to the latter. The bolts 70 and 70a may then be removed and the drum segments 42 and 42a removed from the apparatus 1.

The fastening members 74 and 74a on the clamping rings 73 and 73a, respectively, then may be released to thereby free the sleeve 39 for removal from the end rings 41 and 41a, to thus uncover the central portion of the apparatus 1. With the sleeve 39 removed, the supporting member 32 is accessible from outside the apparatus 1 so that the head portion 36 of the supporting member 32 may be removed, by first removing the bolts 37. Also, the bolts 72 and 72a may be removed from the end rings 41 and 41a, and the end rings 41 and 41a may then be removed from the inner end portions 13 and 13a of the carrier units 7 and 7a, respectively.

Thereafter, the apparatus 1 may again be reassembled, replacing the removed parts with parts which are larger or smaller than the removed parts, depending upon whether the tire to be built on the apparatus is to be larger or smaller in size, respectively. Thus, for example, if the apparatus 1 is to be reassembled to accommodate a larger size tire, a larger head portion 36 may be secured to the body portion 35 of the supporting member 32 by the bolts 37.

Also, new end rings, having outside diameters that are as much greater than the outside diameters of the end rings 41 and 41a as the increased outside diameter of the supporting member, replacing the supporting member 32, may be mounted on the inner end portion 13 and 13a of the carrier units 7 and 7a and secured thereto by the bolts 72 and 72a, respectively. The position of the carrier units 7 and 7a may then be adjusted to the proper new position to accommodate the new sleeve, to be substituted for the sleeve 39, by rotating the shaft 24 and the adjustment nut 57.

Thereafter, the new sleeve 39, of correspondingly greater diameter, may be mounted in operative position around the new supporting member 32 and engaged in the new end rings 41 and 41a. New clamping rings 71 and 71a may then be disposed in position outwardly of the new end rings 41 and 41a, and secured in operative position thereon by reinstalling the clamping rings 73 and 73a and securing the latter in position with the fastening members 74 and 74a, respectively.

Thereafter, new drum segments 42 and 42a, having legs 44 and 45 and 44a and 45a, respectively, of the proper length may be secured to the links 47 and 47a by the bolts 70 and 70a, and then secured to the carrier units 7 and 7a by the bolts 46 and 46a. This completes the reassembling of the apparatus 1.

Thus, it will be seen that the apparatus 1 may be relatively readily and quickly changed to accommodate tires of difference sizes, and that this may be accomplished with relatively little over-haul of the apparatus 1 and with relatively little shut-down time thereof.

From the foregoing, it will be seen that the construction and operation of the apparatus 1 is similar to that of the tire building apparatus shown in my aforementioned co-pending application for U.S. Pat., Ser. No. 087,876, and in my aforementioned application for U.S. Pat, Ser. No. 944,578, the primary differences being that (1) the drum sleeve 39 of the present apparatus is perforated and does not expand outwardly to apply pressure against the portion 65 of the carcass material 63 during the expansion of the latter; and (2) the inclusion of the diaphragms 59 and 59a in the apparatus 1 for preventing leakage of air outwardly between the end housing 13 and the drums 3 and 3a from the interior of the drum 2 and the carcass material portion 65, during expansion of the latter.

A tire building apparatus 101 is shown in FIGS. 14–17 of the drawings to illustrate a modified form of the present invention, and parts of the apparatus 101, which are identical in construction to corresponding parts of the apparatus 1 shown in FIGS. 1–13, are indicated by the same reference numerals, and parts which are similar to parts that are shown in FIGS. 1–13, but have been substituted therefor are shown by the same reference numerals but increased by 100.

The apparatus 101 is identical in construction to the apparatus 1 shown in FIGS. 1–13, except (1) no ply turn-up bag, corresponding to the bags 49 and 49a of the apparatus 1, is embodied therein; (2) locating stops, such as the stops 76, FIGS. 14–17, are embodied on the inner end portions of certain drum segments 142 of the end drum 103; (3) no flexible drum sleeve, such as the drum sleeve 39, is embodied in the apparatus 101; and (4) the apparatus 101 embodies two telescoping cylinders 77 and 77a mounted on the end rings 41 and 41a, which are disposed on the inner ends of the inner end portions 13 and 13a of the side walls 9 and 9a of the carrier units 7 and 7a, respectively, FIG. 14.

The end drum 103, shown in FIGS. 14–17, is identical in construction to the end drum 3, shown in FIGS. 1–13, except that the end drum 103 embodies at least three, or more, of the drum segments 142, equally spaced therearound. The drum segments 142 are identical in construction to the drum segments 42, shown in FIGS. 1–13, except that a locking stop, such as the locking stop 76, FIGS. 14–17, is secured to the inner end portion of each respective drum segment 142 by suitable means, such as, for example, welding. Each of the locking stops 76 is substantially L-shaped in transverse cross section, embodying a lower, substantially horizontally extending leg 78 mounted on and secured to the outer face of the respective drum segment 142 in parallel relation thereto, and an outwardly projecting inner leg 79 disposed substantially perpendicular to the leg 78 in uinplanar relation to the outer edge of the arcuate bead lock clamp member 48 on the respective drum segment 142, FIG. 15.

Figure 14:
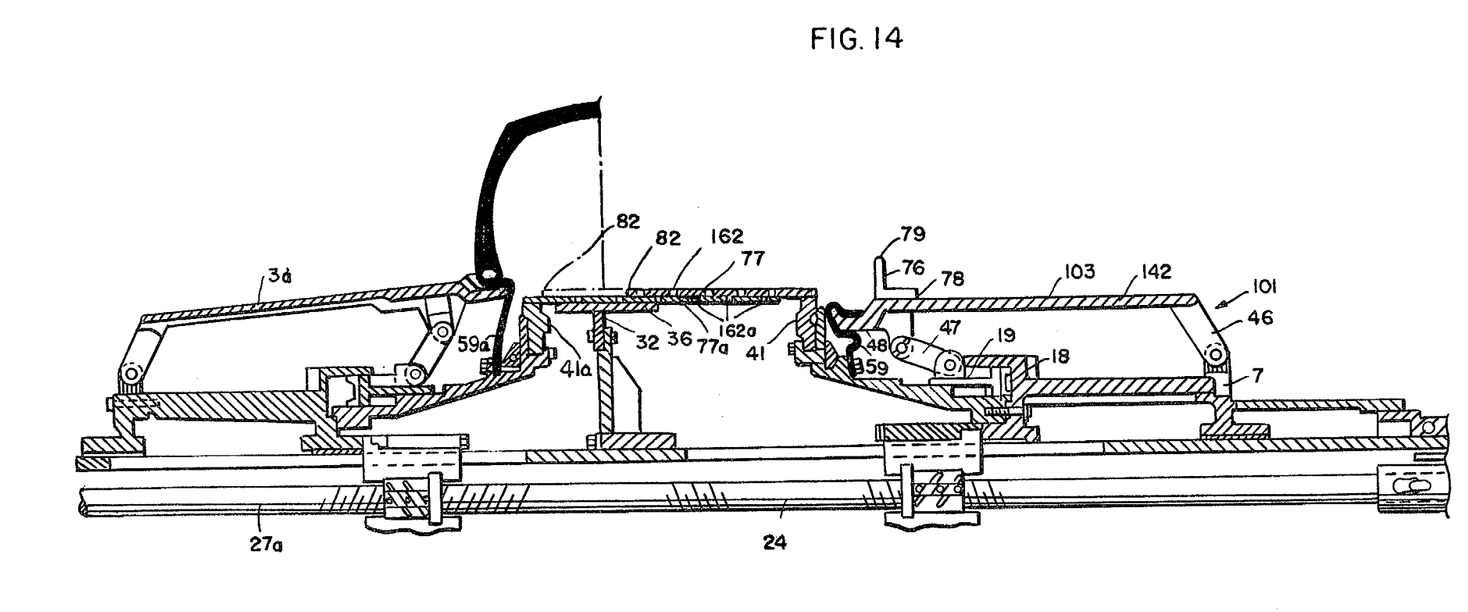
FIG. 14 is a view similar to FIG. 2, but showing a modified form of the present invention.
Figure 15:
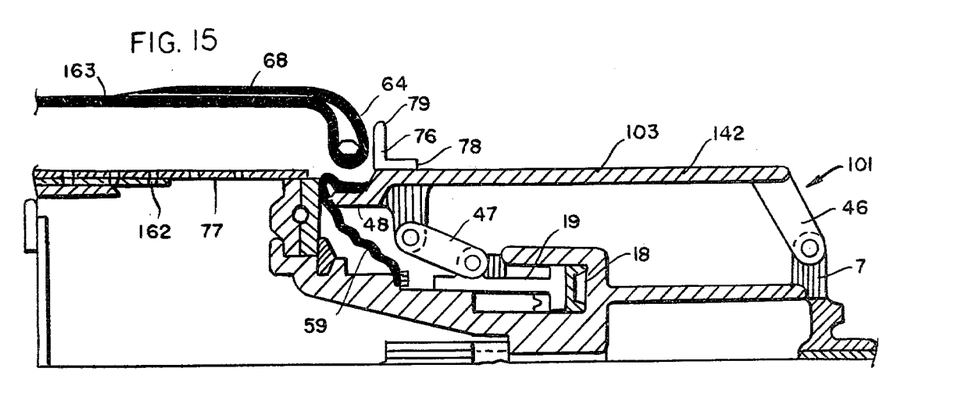
FIGS. 15–17 are diagrammatic longitudinal sectional view corresponding generally to the right end portion of FIG. 14, and similar to FIGS. 5–7, but showing the modified form of the present invention shown in FIG. 14.
Figure 16:
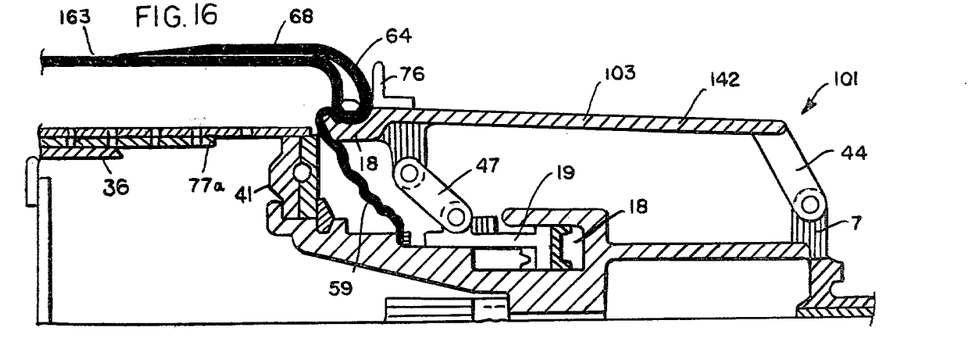
Figure 17:
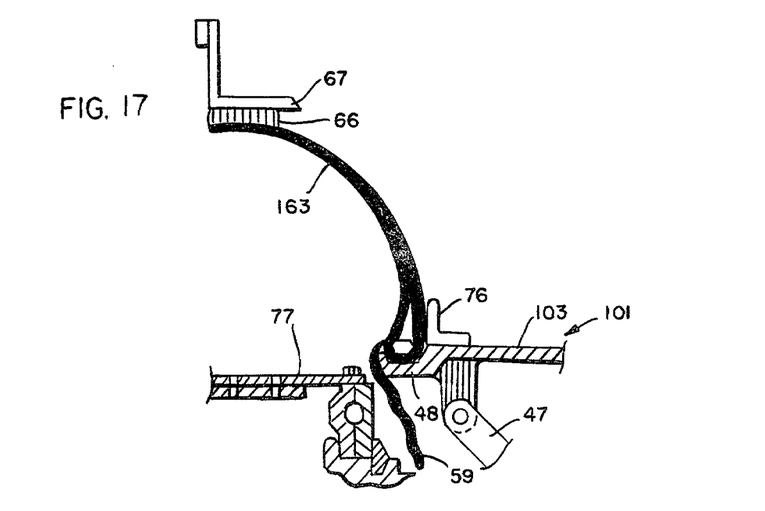

The cylinders 77 and 77a are disposed on the end rings 41 and 41a, respectively, in surrounding relation thereto, and are secured to the end rings 41 and 41a by suitable means such as bolts or screws 81 and 81a, respectively, FIG. 14. The cylinders 77 and 77a are disposed in telescoping relation to each other, with the cylinder 77a disposed within the cylinder 77. The lengths of the cylinders 77 and 77a are such that, when the apparatus 101 is disposed in unactuated position, as illustrated in the right portion of FIG. 14, the inner ends of the cylinders 77 and 77a are disposed around the adjacent edge portion of the head portion 36 of the supporting member 32, as illustrated by the inner edge 82 of the cylinder 77 shown in solid lines in FIG. 14, and when the apparatus 101 is in fully actuated position, as illustrated by the left side of FIG. 14, the inner edges of the cylinders 77 and 77a are disposed on the other side of the head portion 36 of the central supporting member 32, but spaced inwardly from the retaining rings 41a and 41, respectively, as illustrated by the edge portion 82 of the cylinder 77, shown in broken lines in FIG. 14.

Like the diaphragm 39, embodied in the apparatus 1, shown in FIGS. 1–13, the cylinders 77 and 77a have openings 162 and 162a extending therethrough, respectively, for the passage of air laterally outwardly through the cylinders 77 and 77a, as will be discussed in greater detail presently.

From the foregoing, it will be seen that the apparatus 1 may be quickly and easily converted to the apparatus 101, and vice versa. Thus, for example, to convert the apparatus 1 into the apparatus 101, it is merely necessary to remove those drum segments 42 from the apparatus 1 that are to be replaced by the drum segments 142 of the apparatus 101, and substitute the drum segments 142 therefor; remove the air bags 49 and 49a from the apparatus 1; remove the diaphragm 39 from the apparatus 1; and mount the cylinders 77 and 77a in operative position on the end rings 41 and 41a, respectively, of the apparatus 101.

When the apparatus 101 is constructed or set up in the manner shown in FIGS. 14–17, it is intended for use as a "second stage" machine for completing the building of a tire from a tire carcass that has been pre-formed on another "first stage" machine. In this use of the apparatus 101, the pre-formed tire carcass 163 embodies the beads, such as the bead 64, shown in FIGS. 14–17, and the sidewall material, such as the material 68 shown in FIGS. 14-17, of the tire carcass 63, shown in FIGS. 1-13, before the carcass 163 is moved onto the apparatus 101. In moving the tire carcass 163 onto the apparatus 101, it is disposed around the left end of the apparatus 101 and moved to the right, as viewed in FIGS. 14-17 until the bead 64 engages the inner faces of the legs 79 of the locating stops 76. This positioning of the tire carcass 163, properly positions the bead 64, and the corresponding bead on the other side of the carcass 163, in position wherein, they may be properly clampingly engaged by the respective lock clamp members 48 and 48a disposed at respective opposite sides of the transverse center plane of the apparatus 101, during operation of the apparatus 101, as illustrated by the bead lock clamp member 48 in FIG. 16.

After the carcass 163 is thus disposed in proper position around the apparatus 101, the operation of the apparatus 101 is substantially identical to that portion of the operation of the apparatus 1, illustrated by FIGS. 5-7, inclusive. That is, referring to FIGS. 15-17, which show only the right end of the apparatus 101, but remembering that the left end of the apparatus 101, not shown, is identical thereto, except that it is a mirror image thereof and does not include stop 57 and stop ring 76 thereon, and operates in the same manner, piston 19 is moved inwardly in the cylinder 18 from the position shown in FIG. 15 to the position shown in FIG. 16 (which are similar to FIGS. 5 and 6) to thereby move the bead lock clamp members 48 outwardly into locking position with the bead 64. Thereafter, air is fed, under pressure, outwardly through the cylinders 77 and 77a to thereby bulge the carcass material 163 outwardly into the substantially toroidal shape shown in FIG. 17, and the breaker belt 66 and tire cap 67 may then be applied to the carcass material 163 and stitched thereto, as hereinbefore described with respect to the operation of the apparatus 1, shown in FIGS. 1-13, and as illustrated in FIG. 11.

Thereafter, the apparatus 101 may be moved back to its initial operating position and the formed tire carcass may be removed therefrom in the same manner as heretofore described with respect to the apparatus 1.

As will be appreciated by those skilled in the art, although the cylinders 77 and 77a are shown herein as telescoping cylinders having openings 162 therethrough and mounted around a central supporting member 32, this is merely by way of illustration of the preferred form of constructing the apparatus 101, and not by way of limitation and changes in the construction of the supporting structure for the tire carcass material 163 afforded thereby may be made without departing from the purview of the broader aspects of the present invention.

Also, as will be appreciated by those skilled in the art, the telescoping cylinders 77 and 77a of the apparatus 101, shown in FIGS. 14-17, may be substituted for the drum sleeve 39 of the apparatus 1, shown in FIGS. 1-13, without departing from the purview of the broader aspects of the present invention.

From the foregoing it will be seen that the present invention affords a novel tire building apparatus.

Also, it will be seen that the present invention affords a novel tire building apparatus wherein the carcass-forming operation is pneumatically effected in a novel and expeditious manner.

In addition, it will be seen that the present invention affords a novel tire building apparatus which may be quickly and easily changed to build different size tires.

Also, it will be seen that the present invention affords a novel tire building apparatus that can be quickly and easily converted from an apparatus for building a complete tire to an apparatus for use as a "second stage" machine, and vice versa.

Also, it will be seen that the present invention affords a novel tire building apparatus which is practical and efficient in operation and which may be readily and economically produced commercially.

Thus, while I have illustrated and described the preferred embodiments of my invention, it is to be understood that they are capable of variation and modification, and I, therefore, do not wish to be limited to the precise details set forth, but desire to avail myself of such changes and alterations as fall within the purview of the following claims.

I claim:

1. A tire building apparatus including in combination; an elongated shaft, an air-pervious intermediate cylindrical-shaped supporting means mounted on said shaft in surrounding relation thereto to permit passage of air outwardly therethrough, two end supporting means disposed around said shaft on respective opposite sides of said intermediate supporting means, said end supporting means having outer peripheral surfaces for support of the tire carcass components thereon and bead lock clamp means movable radially outwardly to clamp said tire carcass material to the tire beads, wherein in one position said outer peripheral surfaces are disposed in substantially axially aligned relation to the outer peripheral surface of said intermediate cylindrical-shaped supporting means to support said tire carcass material therearound, carrier means mounted on said shaft and operatively connected to said end supporting means, said carrier means being movable relative to said shaft for mounting or demounting said tire carcass material while in the axially outward position and for disposing said bead lock clamp means in position to support said beads in the position of the beads of a finished tire while in an axially inward position, and means for feeding air under pressure into said intermediate cylindrical-shaped supporting means for passage outwardly therethrough into contact with said tire carcass material disposed therearound, simultaneously with said moving of said end supporting means inwardly towards one another, to thereby move the carcass material substantially radially outwardly away from said intermediate cylindrical-shaped supporting means into an expanded position.

2. The tire building apparatus in accordance with claim 1 wherein said tire carcass material comprises preformed tire carcass material including two beads and carcass ply sidewall material projecting from each of said beads toward the other of said beads.

3. The tire building apparatus in accordance with claim 1 wherein said end supporting means further include two elongated cylinders mounted in longitudinally telescoping relation to each other.

4. The tire building apparatus in accordance with claim 1 wherein said intermediate cylindrical shaped supporting means includes an intermediate drum having a porous sleeve comprised of an intermediate portion and two oppositely disposed end portions connected to respective ones of said end supporting means.

5. The tire building apparatus in accordance with claim 4 wherein said sleeve comprises a resilient flexible member.

6. The tire building apparatus in accordance with claim 1 wherein said end supporting means comprises two end drums, each of which includes a flexible annular diaphragm mounted on an end of respective ones of said end drums for preventing the passage of air outwardly to the atmosphere when expanding said tire carcass material.

7. The tire building apparatus in accordance with claim 1 wherein said end supporting means includes abutment means projecting outwardly of said bead lock clamp means for engaging an edge of said tire carcass material and positioning said tire carcass material relative to said bead lock clamp means.

8. The tire building apparatus in accordance with claim 1 further including a plurality of abutment members mounted on one of said end supporting means in spaced relation therearound, and projecting substantially radially outwardly from said one end supporting means in substantially uniplanar relation to the side of said bead lock clamp means on said one end supporting means remote from the other of said end supporting means.

9. The tire building apparatus for building a complete tire in a single operation, including in combination;
an elongated shaft,
an air-pervious intermediate drum mounted on said shaft in surrounding relation thereto, said intermediate drum including a substantially cylindrical central supporting member,
two end drums disposed around said shaft on respective opposite sides of said intermediate drum, said end drums each having outer peripheral surfaces mounted in telescoping relationship with respect to each other and said intermediate drum for support of the tire carcass components thereon and bead lock clamp means movable radially outwardly to clamp said tire carcass material to the tire beads, wherein in one position said outer peripheral surfaces are disposed in substantially axially aligned relation to the outer peripheral surface of said central supporting member to support said tire carcass material therearound,
carrier means mounted on said shaft and operatively connected to said end drums, said carrier means being movable relative to said shaft for moving said end drums inwardly toward each other along said shaft into position to dispose said bead lock clamp means in position to support the beads in the positionof the beads of a finished tire,
means for feeding air under pressure into said air-pervious intermediate drum for passage outwardly therethrough into contact with said tire carcass material disposed therearound, simultaneously with said moving of said end drums inwardly toward each other, to thereby move said tire carcass material substantially radially outwardly into said expanded position thereof, and
carcass ply turn-up means mounted on said end drums axially outwardly of said bead lock clamping means.

10. The tire building apparatus in accordance with claim 9 wherein said air-pervious intermediate drum includes a porous sleeve having an intermediate portion and two oppositely disposed end portions disposed between said end drums.

11. The tire building apparatus in accordance with claim 10 wherein said porous sleeve comprises a resilient flexible member.

12. The tire building apparatus in accordance with claim 10 wherein said end portions of said sleeve are connected to respective end portions of said end drums and are movable therewith and wherein said central supporting member of said intermediate drum radially supports said intermediate portion of said sleeve.

13. The tire building apparatus in accordance with claim 9 further including means for preventing the passage of air outwardly to the atmosphere from said contact with said tire carcass material.

14. The tire building apparatus in accordance with claim 13 wherein said means for preventing the passage of air comprises means sealing the space between said intermediate drum and said end drums.

15. The tire building apparatus in accordance with claim 13 wherein said means for preventing the passage of air includes means extending between said bead lock clamping means and said carrier means.

16. The tire building apparatus in accordance with claim 10 wherein said sleeve comprises a resilient, flexible member, said end portions of said sleeve are operatively connected to said carrier means, and said means extending between said bead lock clamping means and said carrier means comprise two flexible, annular diaphragms disposed on respective opposite sides of said sleeve.

17. The tire building apparatus in accordance with claim 9 wherein said ply turn-up means includes inflatable bags mounted on and extending around said end drums, said inflatable bags being movable between a collapsed position wherein said bags define substantially smooth walled cylindrical members extending around respective ones of said end drums and an inflated position wherein said bags project radially outwardly from said respective drum in position to press the portion of the carcass material placed on said end drums axially outwardly of said bead lock clamp means into engagement with the portion of said tire carcass material disposed on said intermediate drum, when said intermediate portion thereof is disposed in said expanded position, with the apparatus further including means for feeding air under pressure into said bags for moving the latter from said collapsed position to said inflated position.

18. The tire building apparatus in accordance with claim 17 wherein each of said bags comprises an inner, annular, tubular bag and an outer, annular, tubular bag with said outer bags having larger outside diameters than said inner bags, and wherein each of said inner bags is mounted in a respective one of said outer bags in immediately adjacent relation to the inner peripheral surface of the latter and on a respective one of said end drums in immediately adjacent relation to bead lock clamp means of the latter and on a respective one of said end drums in immediately adjacent relation to bead lock clamp means of the latter in such position that when said inner bag is in said inflated position, said inner bag is in position to press that portion of such carcass material disposed immediately outwardly of said bead lock clamp means on said end drum around the bead clamped thereby and into engagement with said carcass material disposed on said end portions of said sleeve immediately inwardly of said bead lock clamp means, each of said outer bags is mounted on a respective one of said end drums in such position, said outer bag is in position to press that portion of said tire carcass material disposed outwardly of said inner bag therein into engagement with said carcass material disposed on said intermediate portion of said intermediate drum.

19. The tire building apparatus in accordance with claim 18 wherein said means for feeding air into said bags comprised means for feeding air into said inner bags at a higher pressure than into said outer bags.

20. The tire building apparatus in accordance with claim 18 wherein said means for feeding air into said bags comprises means for feeding air into said inner bags at a higher pressure than that of the air fed into said intermediate drum by said means for feeding air into said intermediate drum.

21. The tire building apparatus in accordance with claim 18 wherein said means for feeding air into said bags comprises means for feeding air into said inner bags at a pressure higher than into said outer bags and at a pressure higher than that of the air fed into said intermediate drum by said means for feeding air into said intermediate drum.

* * * * *